United States Patent [19]

Steckelberg et al.

[11] Patent Number: 6,086,639
[45] Date of Patent: *Jul. 11, 2000

[54] BLACK DYE MIXTURES OF FIBER-REACTIVE AZO DYES AND USE THEREOF FOR DYEING HYDROXY- AND/OR CARBOXAMIDO-CONTAINING FIBER MATERIAL

[75] Inventors: Joachim Steckelberg, Hofheim; Werner Hubert Russ, Florsheim; Christian Schumacher, Kelkheim; Ron Pedemonte, Eppstein-Vockenhausen, all of Germany

[73] Assignee: Dystar Textilfarben GmbH & Co. Deutschland KG, Frankfurt, Germany

[ * ] Notice: This patent is subject to a terminal disclaimer.

[21] Appl. No.: 09/265,256

[22] Filed: Mar. 9, 1999

[51] Int. Cl.$^7$ .............................. D06P 1/38; D06P 1/382; D06P 1/384; D06P 3/66
[52] U.S. Cl. ........................................ 8/549; 8/641; 8/918
[58] Field of Search ................................ 8/549, 641, 918

[56] References Cited

U.S. PATENT DOCUMENTS

| | | | |
|---|---|---|---|
| 2,657,205 | 10/1953 | Heyna et al. | 260/185 |
| 3,387,914 | 6/1968 | Bohnert et al. | 8/54.2 |
| 4,072,463 | 2/1978 | Schlafer et al. | 8/41 |
| 4,257,770 | 3/1981 | Nishimura et al. | 8/549 |
| 4,725,675 | 2/1988 | Meininger et al. | 534/638 |
| 5,250,670 | 10/1993 | Schläfer et al. | 534/642 |
| 5,445,654 | 8/1995 | Hussong et al. | 8/546 |
| 5,559,215 | 9/1996 | Dannheim et al. | |
| 5,611,821 | 3/1997 | Huang et al. | 8/549 |
| 5,690,698 | 11/1997 | Von der Eltz et al. | |
| 5,849,887 | 12/1998 | Lehmann et al. | |

FOREIGN PATENT DOCUMENTS

| | | |
|---|---|---|
| 0 032 187 | 7/1981 | European Pat. Off. . |
| 0 094 055 | 11/1983 | European Pat. Off. . |
| 0 534 342 | 3/1993 | European Pat. Off. . |
| 0 832 939 | 1/1998 | European Pat. Off. . |
| 1 215 282 | 10/1962 | Germany . |
| 19 11 427 | 9/1970 | Germany . |
| 58-160362 | 9/1983 | Japan . |
| 8-127730 | 5/1996 | Japan . |
| 9-169922 | 6/1997 | Japan . |
| 90-4223 | 3/1990 | Rep. of Korea . |
| 94-2560 | 4/1991 | Rep. of Korea . |

*Primary Examiner*—Margaret Einsmann
*Attorney, Agent, or Firm*—Connolly Bove Lodge & Hutz LLP

[57] ABSTRACT

The present invention comprises a dye mixture comprising one or more, such as one, two or three, disazo dyes conforming to the general formula (1), one or more, such as one, two or three, monoazo dyes conforming to the general formula (2), and one or more, such as one, two or three dyes of the general formulae (3) and (4) wherein the formulae (1) to (4) are defined as given in claim 1, a method for its preparation and a process for dyeing hydroxy- and/or carboxamido containing fiber material in which a inventive dye is applied to the material.

21 Claims, No Drawings

BLACK DYE MIXTURES OF FIBER-REACTIVE AZO DYES AND USE THEREOF FOR DYEING HYDROXY- AND/OR CARBOXAMIDO-CONTAINING FIBER MATERIAL

DESCRIPTION

The present invention relates to the field of fiber-reactive dyes.

Black-dyeing mixtures of fiber-reactive dyes are known from U.S. Pat. Nos. 5,445,654 and 5,611,821 as well as from Korean Patent Application Publication No. 94-2560. Deep black dye mixtures are known, for example, from Japanese Patent Application Publication Sho-58-160 362 which are based on a navy-blue disazo dye and an orange monoazo dye. However these dye mixtures have some deficiencies.

The dyes according to the general formula (1) are known from the U.S. Pat. Nos. 2,657,205, 3,387,914, 4,072,463 and 4,257,770. Monoazo dyes of the formula (2) are described in the DE-A 19 11 427. Dyes of the general formula (3) are described in the Korean Patent Specification No. 90-4223, dyes of the formula (4) are described in DE-C1215282, dyes of the general formula (5) and (6) are described in EP-A 832939 and dyes of the general formula (7) are described in EP-B 0032187, EP-B 0094055 and EP-A 534342.

With the present invention, deep black-dyeing dye mixtures of improved properties have unexpectedly been found, comprising one or more, such as one, two or three, disazo dyes conforming to the general formula (1),

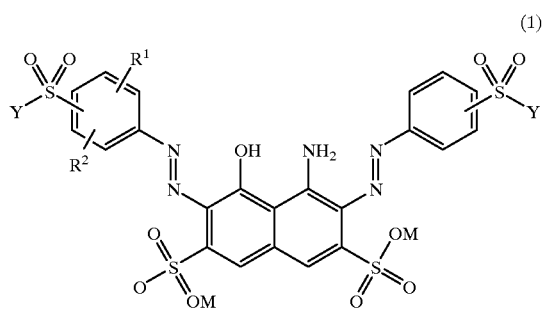

(1)

one or more, such as one, two or three, monoazo dyes conforming to the general formula (2),

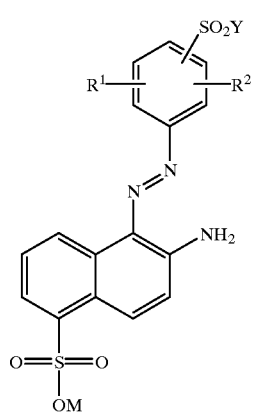

(2)

and one or more, such as one, two or three dyes of the general formulae (3) and/or (4)

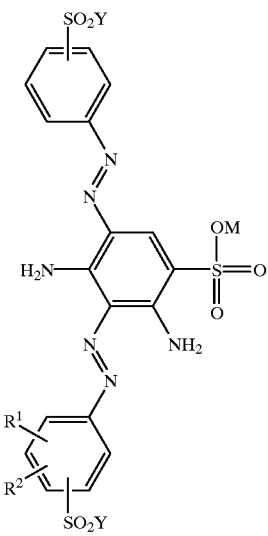

(3)

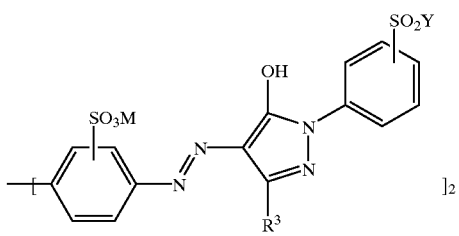

(4)

wherein
$R^1$ and $R^2$ are independently from one another hydrogen, methyl, ethyl, methoxy, ethoxy, hydroxy, sulfo or carboxy, preferably methoxy or hydrogen and in particular hydrogen,
$R^3$ is methyl, carboxy or methoxycarbonyl,
Y is in each instance, independently of the others, vinyl or is ethyl which is substituted in the β-position by a substituent which can be eliminated by the action of an alkali, forming the vinyl group, such as chlorine, thiosulfato, sulfato, alkanoyloxy of 2 to 5 carbon atoms, such as acetyloxy, phosphato, sulfobenzoyloxy and p-toluylsulfonyloxy, and is preferably vinyl, β-chloroethyl, β-thiosulfatoethyl or β-sulfatoethyl and is in particular preferably vinyl or β-sulfatoethyl;
M is hydrogen or an alkali metal, such as lithium, sodium and potassium.

The groups $-SO_2-Y$ are preferably bonded to the benzene ring meta or para to the azo group.

Preference is given to dye mixtures comprising an amount of from 49 to 95% by weight of the diazo dye(s) of the general formula (1), from 4 to 50% by weight of the monoazo dye(s) of the general formula (2) and from 1 to 20% by weight of the dye(s) of the general formulae (3) and/or (4), based on the dye mixture.

Special preference is given to dye mixtures comprising an amount of from 55 to 80% by weight of the disazo dye(s) of the general formula (1), from 10 to 40% by weight of the monoazo dye(s) of the general formula (2) and from 5 to 20% by weight of the dye(s) of the general formulae (3) and/or (4), based on the dye mixture.

The groups "sulfo", "thiosulfato", "carboxy", "phosphato" and "sulfato" include both the acid form and the salt form of these groups. Accordingly, sulfo groups are groups of the formula —SO$_3$M, thiosulfato groups are groups of the formula —S—SO$_3$M, carboxy groups are groups of the formula —COOM, phosphato groups are groups of the formula —OPO$_3$M$_2$ and sulfato groups are groups of the formula —OSO$_3$M, in which M is defined as above.

The dye mixtures according to the present invention may also comprise one or more monoazo dyes of the general formula (5) and/or one or more monoazo dyes of the general formula (6)

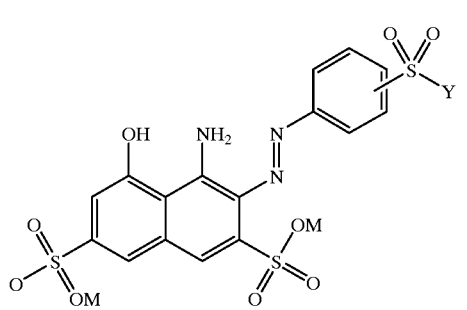

(5)

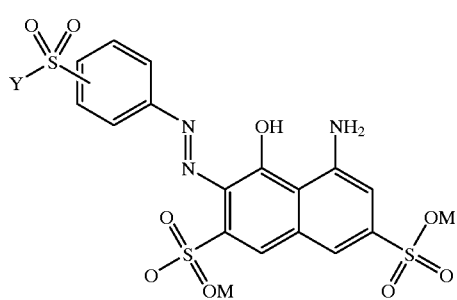

(6)

wherein Y is defined as above. Both dyes are present each in an amount of from 0 to 10%, preferably of from 0.01 to 8% by weight.

The dye mixtures according to the present invention may additionally comprise a red shading dye in an amount of 0 to 10% by weight, preferably of 0 to 5% by weight.

Known dyes of this type are for example monoazo dyes conforming to the formula (7)

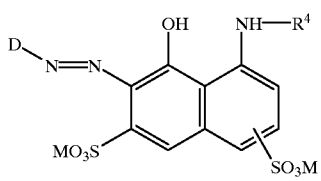

(7)

wherein

D is phenyl substituted by a group —SO$_2$—Y wherein Y is as defined above, such as 3-(β-sulfatoethylsulfonyl)phenyl, 4-(β-sulfatoethylsulfonyl)phenyl, 3-vinylsulfonylphenyl or 4-vinylsulfonylphenyl, M is defined as above and R$^4$ is hydrogen, acetyl, benzoyl or carboxybenzoyl or a group of the formula (a)

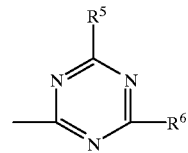

(a)

in which

R$^5$ and R$^6$ are each, independently from one another, fluorine, chlorine, methoxy, ethoxy, alkylamino of 1 to 4 carbons, dialkylamino with alkyl of 1 to 4 carbon atoms, phenylamino or phenylamino substituted in the phenyl by 1 or 2 substituents, such as methyl, ethyl, methoxy, ethoxy, carboxy, sulfo, chlorine and aminocarbonyl, R$^5$ preferably being fluorine and chlorine and R$^6$ preferably being optionally substituted phenylamino as mentioned above.

The dyes of the general formulae (1), (2), (3), (4), (5), (6) and (7), in particular if those corresponding to the same general formula, have the same chromophore, can have, within the meaning of Y, structurally different fiber-reactive groups —SO$_2$—Y. In particular, the dye mixture can contain dyes of the same chromophore conforming to the formula (1) and dyes of the same chromophore conforming to formula (2) and dyes of the same chromophore conforming to formula (3) and/or dyes of the same chromophore conforming to formula (4) and optionally likewise of the general formula (5) and/or (6) and/or (7) in which the fiber-reactive groups —SO$_2$—Y are partly vinylsulfonyl groups and partly groups in which Y is a β-ethyl substituted group as defined above, such as β-chloroethylsulfonyl, β-thiosulfatoethylsulfonyl or, preferably, β-sulfatoethylsulfonyl groups. If the dye mixtures contain the respective dye components in the form of a vinylsulfonyl dye, the proportion of the respective vinylsulfonyl dye to the respective dye with Y being a β-ethyl substituted groups as defined above, such as a β-chloro- or β-thiosulfato- or β-sulfatoethyl-sulfonyl dye, will be up to about 30 mol-%, based on the respective dye chromophore. Preference is here given to the dye mixtures in which the proportion of vinylsulfonyl dye to said β-ethyl substituted dye, such as β-sulfatoethylsulfonyl dye is in terms of the molar ratio between 5:95 and 30:70.

Radicals of the formulae (8) and (9)

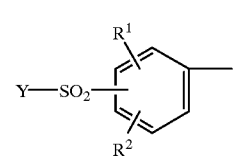

(8)

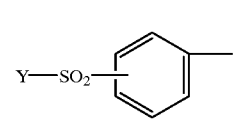

(9)

in the dyes of formulae (1), (2), (3), (5) and (6) are, for example, 3-(β-sulfatoethylsulfonyl)phenyl, 3- or 4-vinylsulfonylphenyl, 4-(β-sulfatoethylsulfonyl)phenyl, 2-carboxy-5-(β-sulfatoethylsulfonyl)phenyl, 2-methoxy-5-(β-sulfatoethylsulfonyl)-phenyl, 2-ethoxy-5-(β-sulfatoethylsulfonyl)phenyl, 2-methyl-4-(β-sulfatoethylsulfonyl)-phenyl, 2-methoxy-4-(β- sulfatoethylsulfonyl)phenyl, 2,5-dimethoxy-4-(β-sulfatoethylsulfonyl)phenyl, 2-methoxy-5-methyl-4-(β-sulfatoethylsulfonyl)phenyl, 3- or 4-(β-thiosulfatoethylsulfonyl)phenyl, 2-methoxy-5-(β-thiosulfatoethylsulfonyl)phenyl, 2-sulfo-4-(β-phosphatoethylsulfonyl)phenyl, 2-sulfo-4-vinylsulfonylphenyl and 3- or 4-(β-acetoxyethylsulfonyl)phenyl and their corresponding vinylsulfonyl derivatives.

Preference is given to the dye mixtures according to the invention, in which the formula members $R^1$ and $R^2$ are each hydrogen and the formula members Y are each, independently of one another, vinyl or β-sulfatoethyl.

The dye mixtures according to the invention thus represent in particular mixtures of one or more, such as one, two or three, preferably one or two, disazo dyes conforming to the general formula (1A)

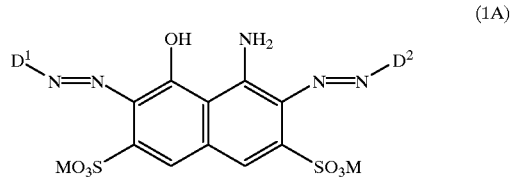

(1A)

one or more monoazo dyes, such as one, two or three, preferably one or two, monoazo dyes conforming to the general formula (2A)

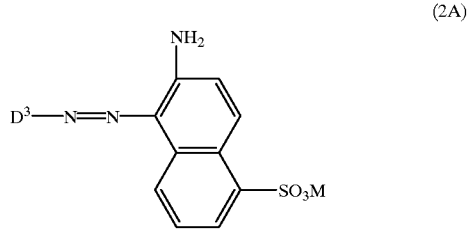

(2A)

and one or more of the dyes of the following general formulae (3A) and (4A)

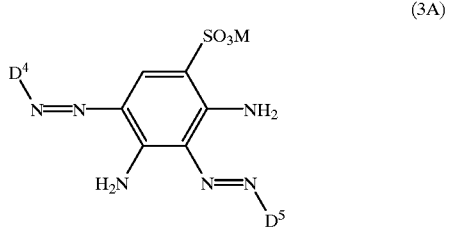

(3A)

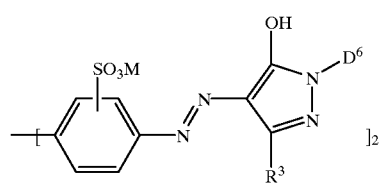

(4A)

where M and $R^3$ are as defined above and $D^1$, $D^2$, $D^3$, $D^4$, $D^5$ and $D^6$ are each independently of the others 3-vinylsulfonylphenyl, 4-vinylsulfonylphenyl, 3-(β-sulfatoethylsulfonyl)phenyl or 4-(β-sulfatoethylsulfonyl)phenyl in the dye weight-ratios which have been given above for the corresponding formulae (1), (2) and (3) and if vinylsulfonyl as well as β-sulfatoethylsulfonyl groups are present in the dye mixtures the molar ratio between the vinylsulfonyl portions and the β-sulfatoethylsulfonyl portions are in a molar ratio between 5:95 and 30:70. In particular, the formula members $D^1$, $D^2$, $D^3$, $D^4$, $D^5$ and $D^6$ have the same meaning.

The dye mixtures of the invention can be present as a preparation in solid or liquid (dissolved) form. In solid form they generally contain the electrolyte salts customary in the case of water-soluble and in particular fiber-reactive dyes, such as sodium chloride, potassium chloride and sodium sulfate, and also the assistants customary in commercial dyes, such as buffer substances capable of establishing a pH in aqueous solution between 3 and 7, such as sodium acetate, sodium borate, sodium bicarbonate, sodium citrate, sodium dihydrogenphosphate and disodium hydrogenphosphate, small amounts of siccatives or, if they are present in liquid, aqueous solution (including the presence of thickeners of the type customary in print pastes), substances which ensure the permanence of these preparations, for example mold preventatives.

If the dye mixtures take the form of dye powders, they contain, as a rule, 10 to 80% by weight, based on the dye powder or preparation, of a strength-standardizing colorless diluent electrolyte salt, such as those mentioned above. These dye powders may in addition contain the abovementioned buffer substances in a total amount of up to 10%, based on the dye powder. If the dye mixtures of the invention are present in aqueous solution, the total dye content of these aqueous solutions is up to about 50% by weight, the electrolyte salt content of these aqueous solutions preferably being below 10% by weight, based on the aqueous solutions (liquid preparations) can in general contain the abovementioned buffer substances in an amount of up to 10% by weight, preferably up to 5% by weight.

The dye mixtures of the invention can be obtained in a conventional manner, for instance by mechanically mixing the individual dyes in the required proportions or by synthesis by means of the customary diazotization and coupling reactions using appropriate mixtures of the diazo and coupling components in a manner familiar to those skilled in the art and the necessary proportions. One option is for example to prepare aqueous solutions of the coupling components 1-amino-8-naphthol-3,6-disulfonic acid, 5-sulfo-2-naphtylamine, 4-sulfo-1,3-phenylenediamine and, as diazo components, one or more aniline compounds of the general formula (10)

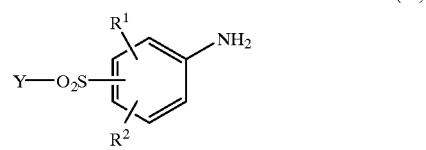

(10)

wherein $R^1$ and $R^2$ are defined as above.

Thus the dye mixture can be produced by diazotizing an aniline component of either 4-(β-sulfatoethylsulfonyl) aniline or 3-(β-sulfatoethylsulfonyl)aniline in a conventional manner in a strongly acid medium and then carrying out the coupling reaction of the 1-amino-8-napthol-3,6-disulfonic acid and the phenylene-1,3-diamine-4-sulfonic acid with one of these diazo components at a pH below 1.5. The second coupling reaction with the monoazo dyes products to form the disazo dyes conforming to the formulae (1) and (3) is carried out with a further diazo component with one of the meanings of (10) at a pH between 3 and 6.5. Then, by addition of the aqueous solution of the 2-napthalene-5-sulfonic acid the coupling reaction to form the dye conforming to the formula (2) is carried out at a pH between 3 and 6.5. To the dye mixture thus obtained can be added dyestuffs of the general formulae (4), (5), (6) and (7) which can be prepared according to the above mentioned documents. The dye mixtures according to the invention thus obtained can be isolated from the solution by the conventional manner, for example by salting out with an electrolyte salt, such as sodium chloride or potassium chloride, or by spray-drying.

Dye mixtures of the invention in which the dye chromophores contain for example not only a β-chloroethylsulfonyl or β-thiosulfatoethylsulfonyl or β-sulfatoethylsulfonyl group but also proportions with vinylsulfonyl groups cannot only be prepared by the abovementioned method but also using appropriate vinylsulfonyl starting anilines by reacting the dye mixture in which Y is a β-chloroethyl, β-thiosulfatoethyl or β-sulfatoethyl radical, with an amount of alkali required for only part of these groups and converting part said β-substituted ethylsulfonyl groups into vinylsulfonyl groups. This measure is carried out by generally known methods of converting β-substituted ethylsulfonyl groups into the vinylsulfonyl group.

The dye mixtures of the instant invention are well suitable for dyeing (which includes printing) hydroxy- and/or carboxamido-containing fiber materials by the application and fixing methods numerously described in the art for fiber-reactive dyes, in deep black shades with good color build-up and good wash-off in respect of unfixed dye portions. Moreover, the dyeings obtained are readily dischargeable and surprisingly show very little or no staining on polyamide fibers.

The present invention therefore also provides for use of the inventive dye mixtures for dyeing (including printing) hydroxy- and/or carboxamido-containing fiber materials and processes for dyeing such fiber materials and processes for dyeing such materials using a dye mixture according to the invention by applying the dye mixture to the substrate in dissolved form and fixing the dyes on the fiber by the action of an alkali or by heating or both.

Hydroxy-containing materials are natural or synthetic hydroxy-containing materials, for example cellulose fiber materials, including in the form of paper, or their regenerated products and polyvinyl alcohols. Cellulose fiber materials are preferably cotton but also other natural vegetable fibers, such as linen, hemp, jute and ramie fibers; regenerated cellulose fibers are for example staple viscose and filament viscose.

Carboxamido-containing materials are for example synthetic and natural polyamides and polyurethanes, in particular in the form of fibers, for example wool and other animal hairs, silk, leather, nylon-6,6, nylon-6, nylon-11, and nylon-4.

Application of the dye mixtures of the invention is by generally known processes for dyeing and printing fiber materials by the known application techniques for fiber-reactive dyes. Since the dyes of the dye mixtures according to the invention are highly compatible with one another, the dye mixtures of the invention are also advantageously useful in exhaust dyeing processes. Applied in this way for example to cellulose fibers from a long liquor ratio at temperatures between 40 and 105° C., optionally at temperatures up to 130° C., under superatmospheric pressure, and optionally in the presence of customary dyeing assistants with the use of acid-binding agents and optionally neutral salts, such as sodium chloride or sodium sulfate, they produce dyeings in very good color yields with excellent color build-up and consistent shade. One possible procedure is to introduce the material into the warm bath, gradually heat the bath to the desired dyeing temperature, and complete the dyeing process at that temperature. The neutral salts which speed up the exhaustion of the dyes can also if desired not be added to the bath until the actual dyeing temperature has been reached.

Similarly, the conventional printing processes for cellulose fibers, which can either be carried out in single-phase, for example by printing with a print paste containing sodium bicarbonate or some other acid-binding agent and the colorant, and subsequent steaming at from 100 to 103° C., or in two phases, for example by printing with a neutral or weakly acid print paste containing the colorant and subsequent fixation either by passing the printed material through a hot electrolyte-containing alkaline bath or by overpadding with an alkaline electrolyte-containing padding liquour and subsequent batching of this treated material or subsequent steaming or subsequent treatment with dry heat, produce strong prints with well defined contours and a clear white ground. Changing fixing conditions has only little effect on the outcome of the prints. Not only in dyeing but also in printing the degrees of fixation obtained with dye mixtures of the invention are very high. The hot air used in dry heat fixing by the customary thermofix processes has a temperature of from 120 to 200° C. In addition to the customary steam at from 101 to 103° C., it is also possible to use superheated steam and high pressure steam at up to 160° C.

Acid-binding agents responsible for fixing the dyes to cellulose fibers are for example water-soluble basic salts of alkali metals and of alkaline earth metals of inorganic or organic acids, and compounds which release alkali when hot. Of particular suitability are the alkali metal hydroxides and alkali metal salts of weak to medium inorganic or organic acids, the preferred alkali metal compounds being the sodium and potassium compounds. These acid-binding agents are for example sodium hydroxide, potassium hydroxide, sodium carbonate, sodium bicarbonate, potassium carbonate, sodium formate, sodium dihydrogenphosphate and disodium hydrogenphosphate.

Treating the dyes of the dye mixtures according to the invention with the acid-binding agents with or without heating bonds the dyes chemically to the cellulose fiber; especially the dyeings on cellulose, after they have been given the usual aftertreatment of rinsing to remove unfixed dye portions, show excellent wet fastness properties, in particular since the unfixed dye portions are readily washed off because of their good cold water solubility. The dyeings of polyurethane and polyamide fibers are customarily carried out from an acid medium. The dyebath may contain for example acetic acid and/or ammonium sulfate and/or acetic acid and ammonium acetate or sodium acetate to bring it to the desired pH. To obtain a dyeing of acceptable levelness it is advisable to add customary leveling assistants, for example based on a reaction product of cyanuric chloride with three times the molar amount of an aminobenzenesulfonic acid or aminonaphthalenesulfonic acid or based on a reaction product of for example stearylamine with ethylene oxide. In general the material to be dyed is introduced into the bath at a temperature of about 40° C. and agitated therein for some time, the dyebath is then adjusted to the desired weakly acid, preferably weakly acetic acid, pH, and the actual dyeing is carried out at temperature between 60 and 98° C. However, the dyeings can also be carried out at the boil or at temperatures up to 120° C. (under superatmospheric pressure).

The examples which follow illustrate the invention. Parts and percentages are by weight, unless otherwise stated. The parts by weight bear the same relation to parts by volume as the kilogram to the liter.

EXAMPLE 1

200 parts of an electrolyte-containing dye powder which contains the navy-dyeing disazo dye of the formula (1B)

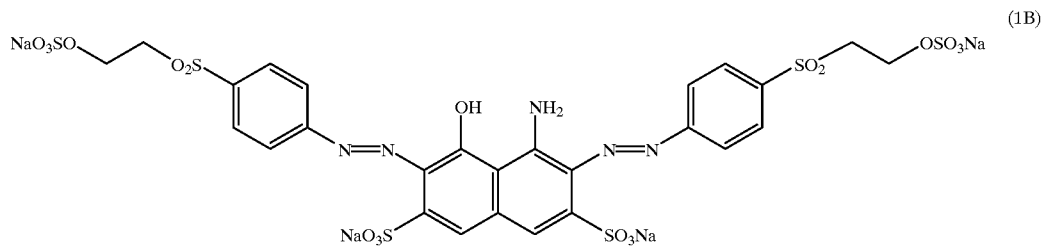

in a proportion of 50% are mechanically mixed with 75 parts of an electrolyte-containing dye powder which contains the orange-dyeing monoazo of the formula (2B) in a 70% proportion

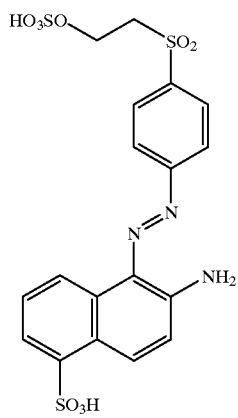

and a 25 parts of an electrolyte-containing dye powder which contains the yellow-dyeing azo dye of the formula (3B) in a 60% proportion

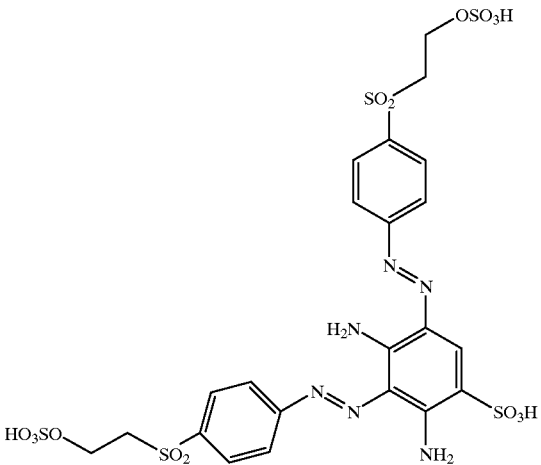

The resulting dye mixture according to the invention, when employed according to the the application and fixing methods customary in the art for fiber-reactive dyes, produces for example on cellulose fiber materials dyeings and prints in deep black shades.

EXAMPLE 2

A dye mixture according to the invention is prepared by diazotizing a suspension of 281 parts of 4-(β-sulfatoethylsulfonyl)aniline in 650 parts of ice-water and 180 parts of 30% aqueous hydrochloric acid with 173 parts of 40% strength aqueous sodium nitrite solution. 120 parts of 1-amino-8-napthol-3,6-disulfonic acid is added and the first coupling is carried out at a pH between 1 and 1.3 and at a temperature below 20° C. (the pH is maintained with about 50 parts of sodium bicarbonate). 72 parts 2-aminonaphtaline-5-sulfonic acid is added to the above coupling mixture and the pH is raised to 6 with sodium carbonate at a temperature below 30° C.

To the resulting solution containing the dyes of formulae (1B) and (2B) mentioned in Example 1 is added 109 parts of a dye of the formula (4B), which was prepared according to DE-C 1215282.

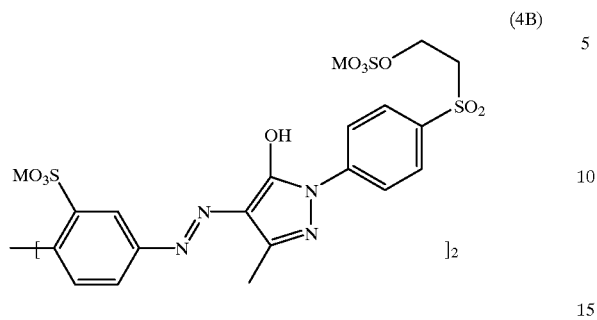

(4B)

This dye solution can be adjusted to pH 4.5 by adding 5 parts of a sodium phosphate buffer. By further diluting with water or by evaporating the solution, this liquid dye mixture can then be standardized to the desired strength for a liquid preparation. The dye mixture affords deep black shades on cellulosic materials.

EXAMPLE 3

70 parts of an electrolyte-containing dye powder which contains the orange-dyeing monoazo dye of the above mentioned formula (2B) in a proportion of 70%, 200 parts of an electrolyte-containing dye powder which contains the navy-dyeing disazo dye of the formula (1B) in a proportion of 50%, 30 parts of an electrolyte-containing dye powder which contains the yellow-dyeing disazo dye of the above mentioned formula (3B) in a proportion of 70% and for the purpose of shading 5 parts of an electrolyte-containing dye powder which contains the red dyeing monoazo dye of the formula (7A)

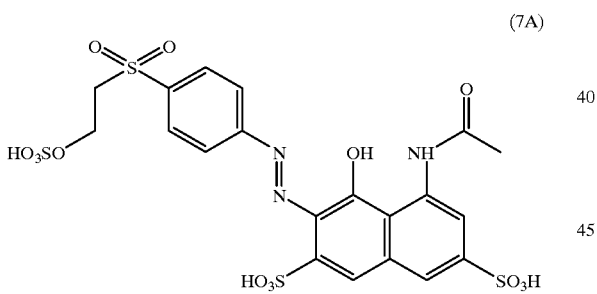

(7A)

in a proportion of 50% are mechanically mixed with one another. The dye mixture according to the invention, employed by the application and fixing methods customary in the art for fiber-reactive dyes, produces for example on cotton deep black dyeings.

EXAMPLES 4 to 53

The table examples which follow describe further dye mixtures according to the invention of the dyes conforming to the formulae (1A), (2C), (3C), (4A), (5A), and (6A) by means of their formula components (M having one of the abovementioned meanings) and the mixing ratios of the dyes by percent by weight. When employed according to the application and fixing methods customary in the art for fiber-reactive dyes, these dye mixtures produce, for example, on cellulose fiber materials, deep black dyeings.

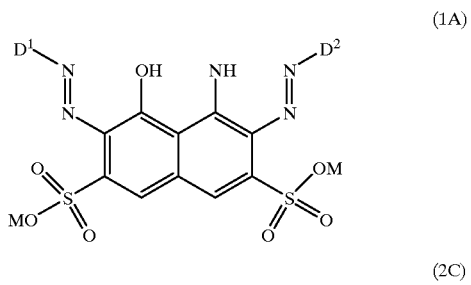

(1A)

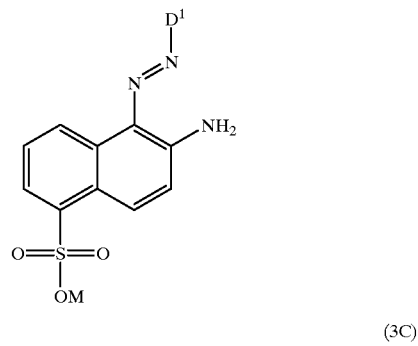

(2C)

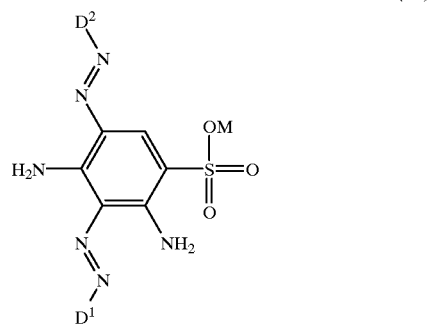

(3C)

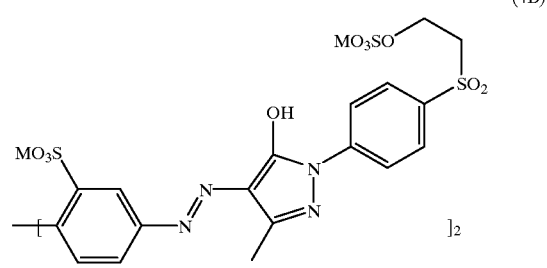

(4B)

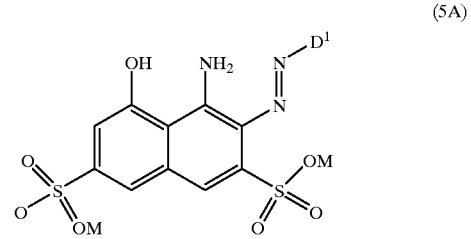

(5A)

-continued

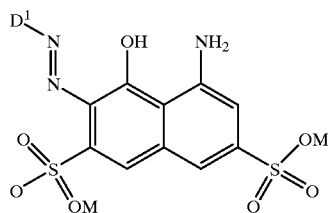

(6A)

| Ex. | D1 | D2 | 4 | Ratio dye 1A:2C:3C:4:5A:6A |
|---|---|---|---|---|
| 4 | 4-(β-Sulfatoethylsulfonyl)phenyl | 4-(β-(Sulfatoethylsulfonyl)phenyl | — | 68.3:19.5:9.7:0:1.9:0.6 |
| 5 | " | " | — | 63.4:19.5:14.6:0:1.9:0.6 |
| 6 | " | " | — | 72:11.5:12.5:0:2.8:1.2 |
| 7 | " | " | — | 70:9.3:14:0:4.7:2 |
| 8 | 3-(β-Sulfatoethylsulfonyl)-phenyl | " | — | 68.3:19.5:9.7:0:2:0.5 |
| 9 | " | " | — | 63.3:19.5:14.6:0:2:0.6 |
| 10 | " | " | — | 72:11.5:12.5:0:3:1 |
| 11 | " | " | — | 70:9.3:14:0:4.7:2 |
| 12 | 2-Methoxy-5-(β-Sulfatoethylsulfonyl)-phenyl | " | — | 68.4:19.6:9.8:0:1.9:0.3 |
| 13 | " | " | — | 63.5:19.5:14.5:0:1.9:0.6 |
| 14 | " | " | — | 72:11.5:12.5:0:3:1 |
| 15 | " | " | — | 70:9.3:14:0:4.7:2 |
| 16 | 2-Methoxy-5-methyl-4-(β-Sulfatoethylsulfonyl)-phenyl | " | — | 70:20:10:0:0:0 |
| 17 | " | " | — | 65:20:15:0:0:0 |
| 18 | " | " | — | 75:12:13:0:0:0 |
| 19 | " | " | — | 75:10:15:0:0:0 |
| 20 | 4-(β-Sulfatoethylsulfonyl)phenyl | 3-(β-Sulfatoethylsulfonyl)phenyl | — | 70:20:10:0:0:0 |
| 21 | " | " | — | 65:20:15:0:0:0 |
| 22 | " | " | — | 75:12:13:0:0:0 |
| 23 | " | " | — | 75:10:15:0:0:0 |
| 24 | 3-(β-Sulfatoethylsulfonyl)-phenyl | " | — | 70:20:10:0:0:0 |
| 25 | " | " | — | 65:20:15:0:0:0 |
| 26 | " | " | — | 75:10:15:0:0:0 |
| 27 | 2-Methoxy-5-(β-Sulfatoethylsulfonyl)-phenyl | " | — | 70:20:10:0:0:0 |
| 28 | " | " | — | 65:20:15:0:0:0 |
| 29 | " | " | — | 75:12:13:0:0:0 |
| 30 | 2-Methoxy-5-methyl-4-(β-Sulfatoethylsulfonyl)-phenyl | " | — | 70:20:10:0:0:0 |
| 31 | " | " | — | 65:20:15:0:0:0 |
| 32 | " | " | — | 75:12:13:0:0:0 |
| 33 | " | " | — | 75:10:15:0:0:0 |
| 34 | 4-(β-Sulfatoethylsulfonyl)phenyl | 4-(β-Sulfatoethylsulfonyl)phenyl | 4B | 65:18.5:0:9.3:6.5:0.7 |
| 35 | 2-Methoxy-5-methyl-4-(β-Sulfatoethylsulfonyl)-phenyl | " | " | 66:19:0:9.5:4.5:1 |
| 36 | 3-(β-Sulfatoethylsulfonyl)-phenyl | " | " | 64:18:0:9.6:6.5:2.5 |
| 37 | β-Methoxy-5-(β-Sulfatoethylsulfonyl)-phenyl | " | " | 65:18.7:0:9.3:3.7:3.3 |
| 38 | 4-(β-Sulfatoethylsulfonyl)phenyl | 3-(β-Sulfatoethylsulfonyl)phenyl | " | 65:18.5:0:9.3:6.5:0.7 |
| 39 | 3-(β-Sulfatoethylsulfonyl)phenyl | " | " | 68:19.5:0:9.8:2:0.7 |
| 40 | 2-Methoxy-5-(β-Sulfatoethylsulfonyl)-phenyl | " | " | 68.5:19.5:0:9.8:1.1:1.1 |
| 41 | 2-Methoxy-5-methyl-4-(β-Sulfatoethylsulfonyl)-phenyl | " | " | 67.6:19.4:0:9.6:2.8:0.8 |
| 42 | 4-(β-Sulfatoethylsulfonyl)phenyl | 4-(β-Sulfatoethylsulfonyl)phenyl | * | 67.3:19.3:0:9.6:1:3.8 |
| 43 | 2-Methoxy-5-methyl-4-(β-Sulfatoethylsulfonyl)-phenyl | " | " | 66:19:0:9.5:3.6:1.9 |
| 44 | 3-(β-Sulfatoethylsulfonyl)-phenyl | " | " | 66:18:0:9.5:4.2:2.3 |
| 45 | 2-Methoxy-5-(β-Sulfatoethylsulfonyl)-phenyl | " | " | 66:19:0:9.5:3.6:1.9 |
| 46 | 4-(β-Sulfatoethylsulfonyl)phenyl | 3-(β-Sulfatoethylsulfonyl)phenyl | " | 66:19:0:9.5:3.6:1.9 |
| 47 | 3-(β-Sulfatoethylsulfonyl)-phenyl | " | " | 67:19:0:9.5:3.8:0.7 |
| 48 | 2-Methoxy-5-(βSulfatoethylsulfonyl)-phenyl | " | " | 67.5:19.5:0:9.5:2.8:0.7 |
| 49 | 2-Methoxy-5-methyl-4-(β-Sulfatoethylsulfonyl)-phenyl | " | " | 66.5:19:0:9.5:2.8:2.2 |
| 50 | 4-(β-Sulfatoethylsulfonyl)phenyl | 4-(β-Sulfatoethylsulfonyl)phenyl | " | 62.5:19.2:4.8:9.6:2.4:1.5 |

-continued

| Ex. | D1 | D2 | 4 | Ratio dye 1A:2C:3C:4:5A:6A |
|---|---|---|---|---|
| 51 | 4-(β-Sulfatoethylsulfonyl)phenyl | 4-(β-Sulfatoethylsulfonyl)phenyl | " | 62.5:19.4:9.6:4.8:2.8:0.9 |
| 52 | 4-(β-Sulfatoethylsulfonyl)phenyl | 4-(β-Sulfatoethylsulfonyl)phenyl | 4B | 60:18.8:4.6:9.3:4.6:2.7 |
| 53 | 4-(β-Sulfatoethylsulfonyl)phenyl | 4-(β-Sulfatoethylsulfonyl)phenyl | 4B | 59.5:18.4:9:4.6:4.6:3.9 |

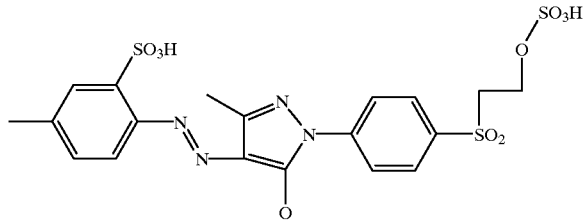

What claimed is:

1. A dye mixture comprising one or more disazo dyes conforming to the general formula (1),

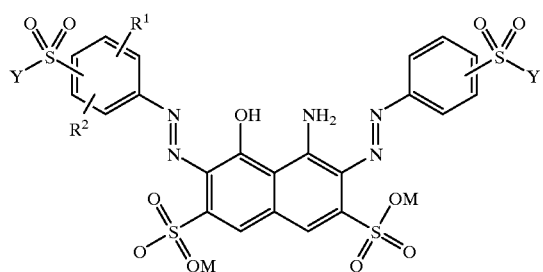

one or more monoazo dyes conforming to the general formula (2),

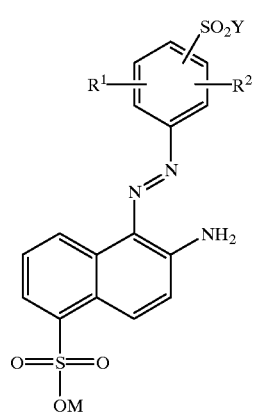

and one or more dyes of the general formula (4)

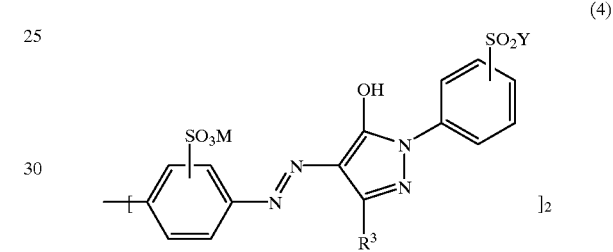

wherein
$R^1$ and $R^2$ are independently from one another hydrogen, methyl, ethyl, methoxy, ethoxy, hydroxy, sulfo or carboxy,
$R^3$ is methyl, carboxy or methoxycarbonyl,
Y is in each instance, independently of the others, vinyl or is ethyl which is substituted in the β-position by a substituent which is eliminated by the action of an alkali, forming the vinyl group and
M is hydrogen or an alkali metal.

2. The dye mixture according to claim 1 comprising an amount of from 49 to 95% by weight of the disazo dyes of the formula (1), from 4 to 50% by weight of the monoazo dye(s) of the general formula (2) and from 1 to 20% by weight of the dyes of the general formula (4).

3. A dye mixture according to claim 1, wherein $R^1$ and $R^2$ are each hydrogen.

4. A dye mixture according to claim 1, wherein Y is in each instance, independently of the others, vinyl or is ethyl substituted in the β-position by chlorine, thiosulfato, sulfato, alkanoyloxy of 2 to 5 carbon atoms, phosphate, sulfobenzyoyloxy or p-toluylsulfonyloxy.

5. A dye mixture according to claim 1, wherein Y is in each instance, independently of the others, vinyl or β-sulfatoethyl.

6. A process for the preparation of the dye mixture according to claim 1, comprising mechanically mixing the individual dyes of the formulae (1) to (4) in the required proportions.

7. A process for dyeing hydroxy-and/or carboxamido-containing fiber material which comprise applying the dye mixture as claimed in claim 1 to the material and the dyes are fixed to the material by means of (a) heat or (b) with the aid of an alkali or (c) by means of heat and with the aid of an alkali.

8. The dye mixture according to claim 1, wherein 1, 2 or 3 disazo dyes conforming to the general formula (1),

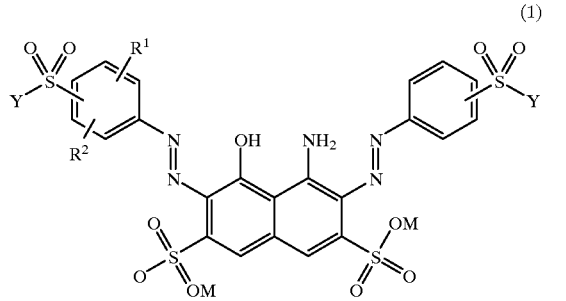
(1)

one, two or three monoazo dyes conforming to the general formula (2)

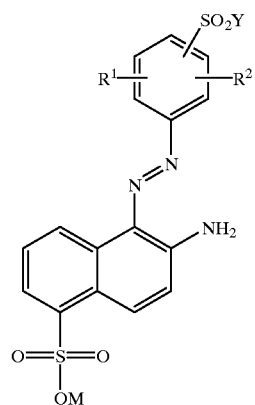
(2)

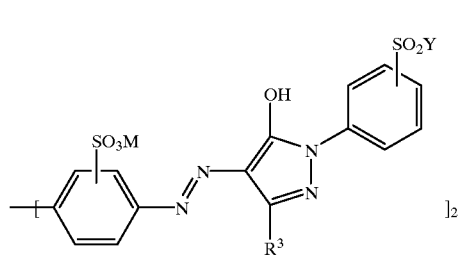
(4)

and one, two or three dyes conforming to the formula (4) are present.

9. The dye mixture as claimed in claim 1, which further comprises one or more monoazo dye(s) of the formula (5)

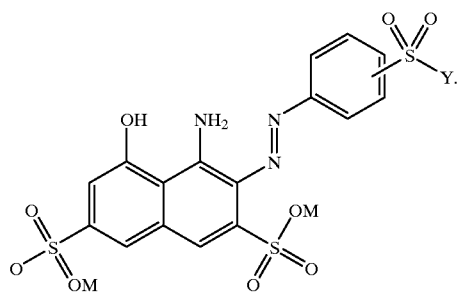
(5)

10. The dye mixture according to claim 1, which further comprises one or more monoazo dyes of the formula (6)

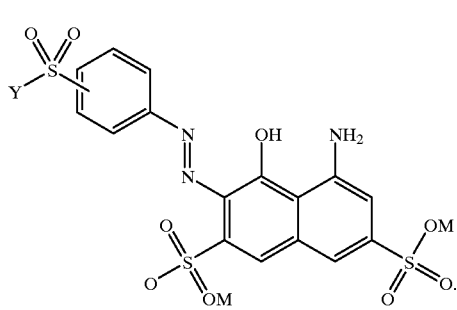
(6)

11. The dye mixture according to claim 10, which further comprises one or more monoazo dyes of the formula (6)

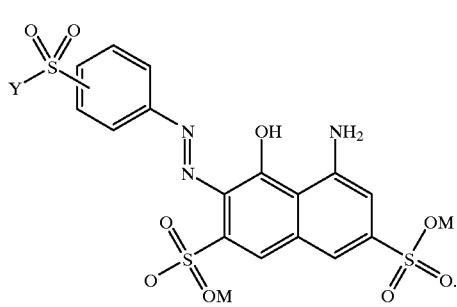
(6)

12. The dye mixture as claimed in claim 11, wherein the dyes of formula (5) and formula (6) are present in an amount from 0.01 to 8% by weight.

13. The dye mixture according to claim 12, which further comprises a red shading dye.

14. The dye mixture as claimed in claim 13, wherein the red shading dye is of the formula (7) and is present in an amount not to exceed 5% by weight

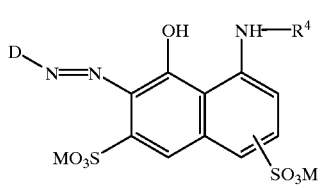
(7)

wherein

D is phenyl substituted by a group —SO$_2$—Y wherein Y is in each instance, independently of the others, vinyl or is ethyl which is substituted in the β-position by a substituent which is eliminated by the action of an alkali, forming the vinyl group, M is hydrogen or an alkali metal, R$^4$ is hydrogen, acetyl, benzoyl, carboxybenzoyl or a group of the formula (a)

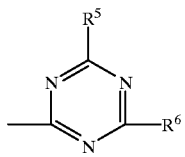

(a)

in which

R$^5$ and R$^6$ are each, independently from one another, fluorine, chlorine, methoxy, ethoxy, alkylamino of 1 to 4 carbons, dialkylamino with alkyl of 1 to 4 carbon atoms, phenylamino or phenylamino substituted in the phenyl by 1 or 2 substituents.

15. A process for the preparation of the dye mixture which comprises diazotizing an aniline component of either 4-(β-sulfatoethylsulfonyl)aniline or 3-(β-sulfatoethylsulfonyl) aniline in a strongly acid medium and then carrying out the coupling reaction of the 1-amino-8-napthol-3,6-disulfonic acid with one of these diazo components at a pH below 1.5, followed by a second coupling reaction with the monoazo dye product giving the disazo dye conforming to the formula (1) which is carried out with a further diazo component with one of the meanings of

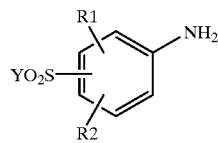

at a pH between 3 and 6.5 and by addition of the aqueous solution of the 2-napthalene-5-sulfonic acid giving the dye conforming to the formula (2) and subsequent addition of dyestuff conforming to the formulae (4)

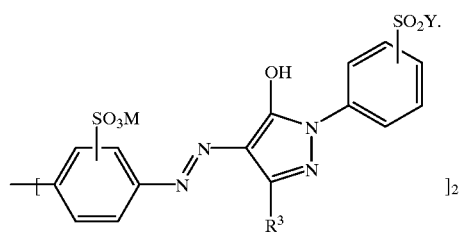

16. The process as claimed in claim 15, which further comprises adding one or more monoazo dye(s) of the formula (5)

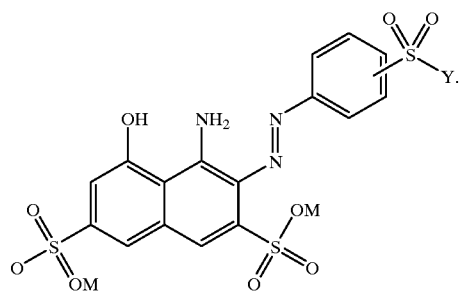

(5)

17. The process as claimed in claim 15, which further comprises adding one or more monoazo dyes of the formula (6)

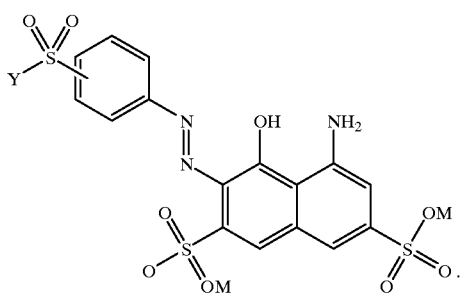

(6)

18. The process as claimed in claim 16, which further comprises adding one or more monoazo dyes of the formula (6)

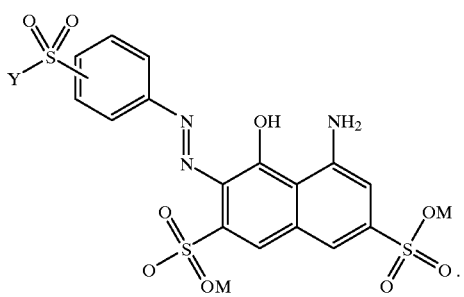

(6)

19. The process as claimed in claim 18, wherein the dyes of formula (5) and formula (6) are present in an amount from 0.01 to 8% by weight.

20. The process as claimed in claim 19, which further comprises adding a red shading dye.

21. The process as claimed in claim 20, wherein the red shading dye is of the formula (7) and is present in an amount not to exceed 5% by weight

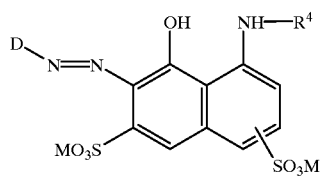 (7)

wherein
- D is phenyl substituted by a group —$SO_2$—Y wherein Y is in each instance, independently of the others, vinyl or is ethyl which is substituted in the β-position by a substituent which is eliminated by the action of an alkali, forming the vinyl group,
- M is hydrogen or an alkali metal,
- $R^4$ is hydrogen, acetyl, benzoyl, carboxybenzoyl or a group of the formula (a)

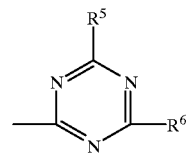 (a)

in which
- $R^5$ and $R^6$ are each, independently from one another, fluorine, chlorine, methoxy, ethoxy, alkylamino of 1 to 4 carbons, dialkylamino with alkyl of 1 to 4 carbon atoms, phenylamino or phenylamino substituted in the phenyl by 1 or 2 substituents.

* * * * *